Figure 1:
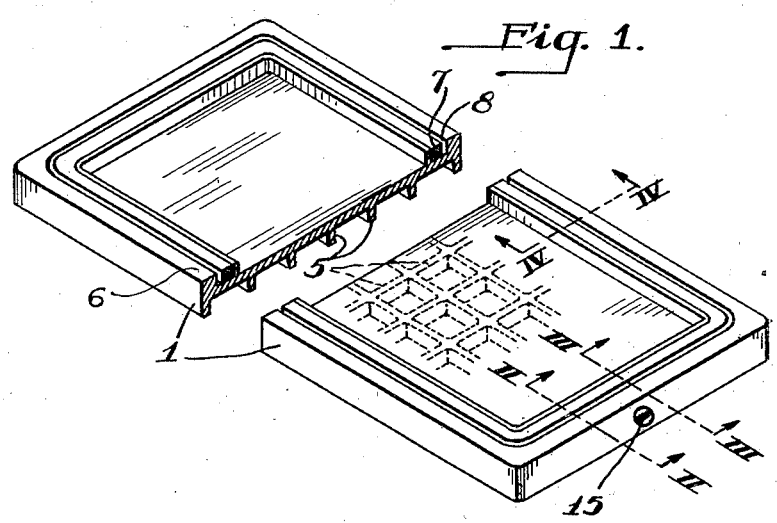
Figure 8:
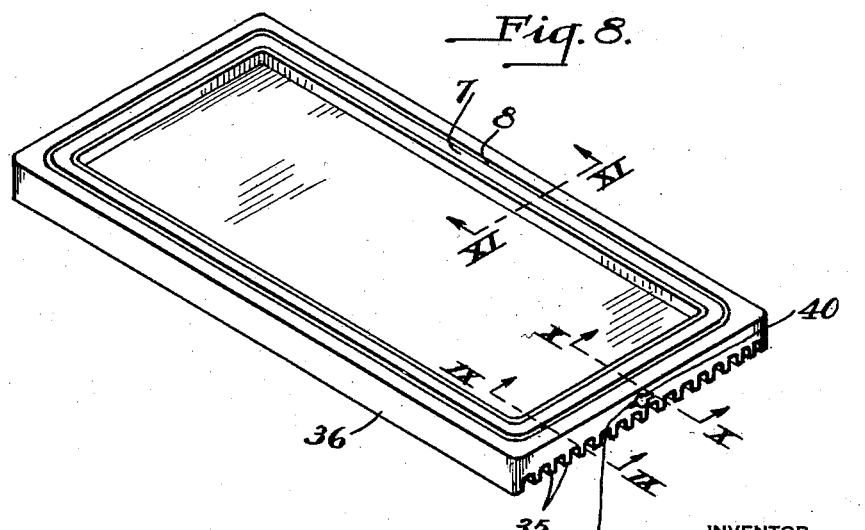

Oct. 15, 1929.　　　W. O. LYTLE　　　1,732,023
PROCESS AND APPARATUS FOR MAKING COMPOSITE GLASS
Filed Feb. 6, 1928　　　5 Sheets-Sheet 1

INVENTOR
William O Lytle
by
James C Bradley
atty

Oct. 15, 1929.  W. O. LYTLE  1,732,023
PROCESS AND APPARATUS FOR MAKING COMPOSITE GLASS
Filed Feb. 6, 1928  5 Sheets-Sheet 2
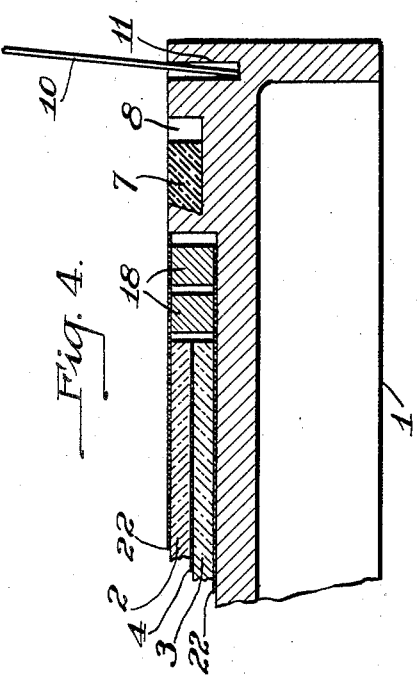
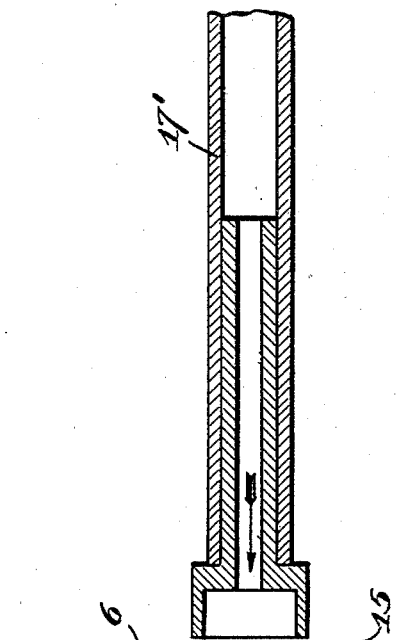
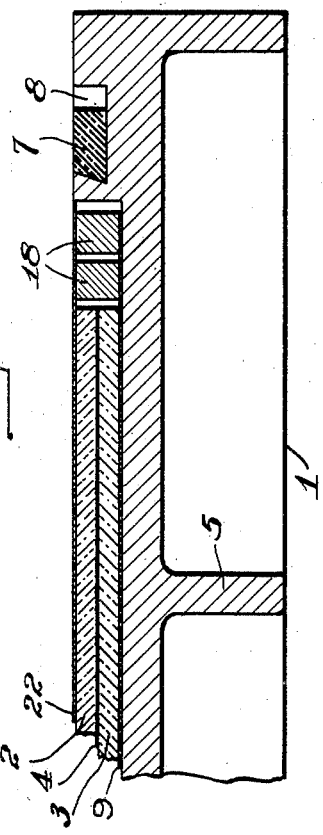
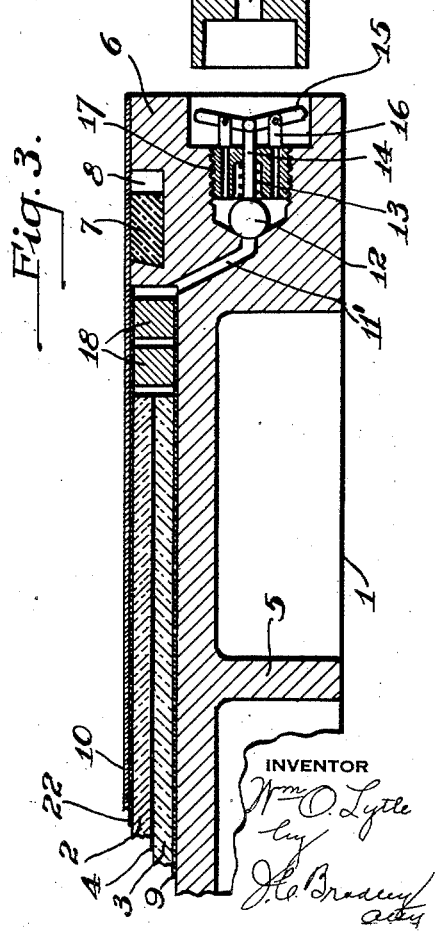
INVENTOR
Wm O. Lytle
by
J. C. Bradley
atty Oct. 15, 1929.  W. O. LYTLE  1,732,023
PROCESS AND APPARATUS FOR MAKING COMPOSITE GLASS
Filed Feb. 6, 1928  5 Sheets-Sheet 3

INVENTOR
William O. Lytle
by
James L. Bradey
atty.

Oct. 15, 1929.   W. O. LYTLE   1,732,023
PROCESS AND APPARATUS FOR MAKING COMPOSITE GLASS
Filed Feb. 6, 1928   5 Sheets-Sheet 4
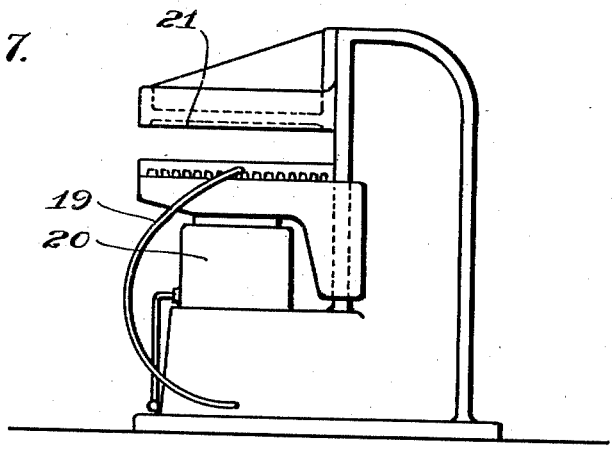
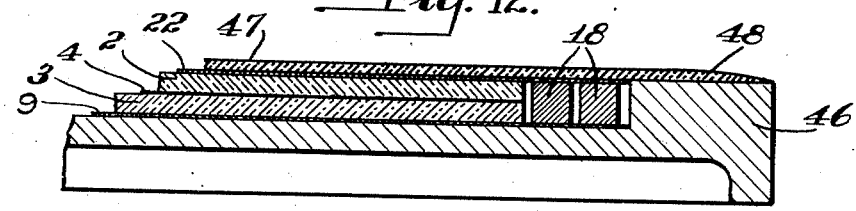
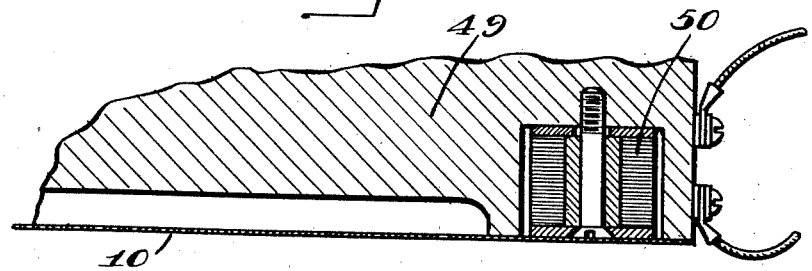
INVENTOR
William O Lytle
by
James C Bradley
atty Oct. 15, 1929.    W. O. LYTLE    1,732,023
PROCESS AND APPARATUS FOR MAKING COMPOSITE GLASS
Filed Feb. 6, 1928    5 Sheets-Sheet 5
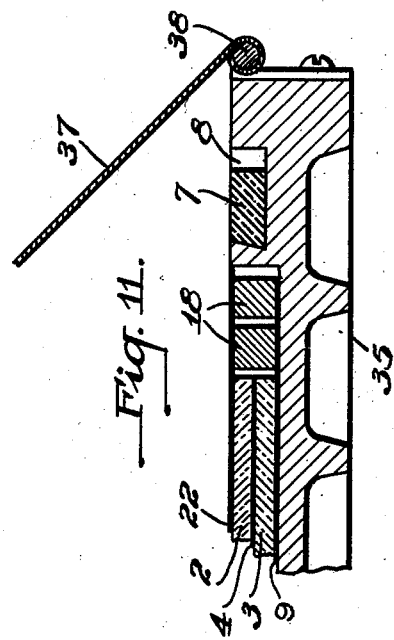
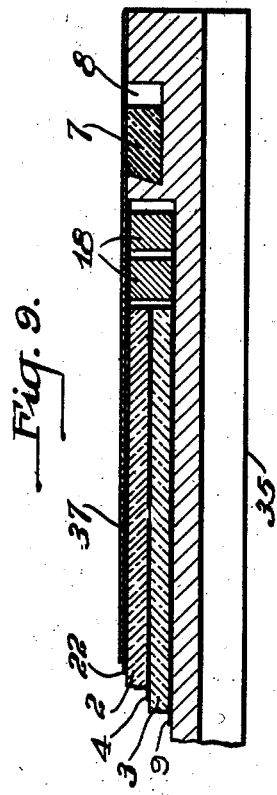
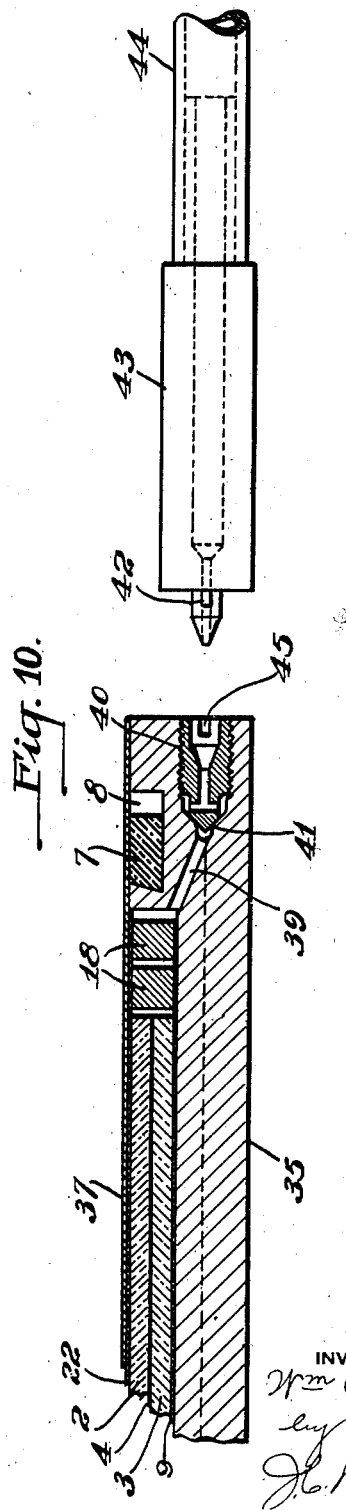
INVENTOR
Wm O. Lytle
by
J. C. Bradey
Atty Patented Oct. 15, 1929

1,732,023

UNITED STATES PATENT OFFICE

WILLIAM O. LYTLE, OF NEW KENSINGTON, PENNSYLVANIA, ASSIGNOR TO PITTSBURGH PLATE GLASS COMPANY, A CORPORATION OF PENNSYLVANIA

PROCESS AND APPARATUS FOR MAKING COMPOSITE GLASS

Application filed February 6, 1928. Serial No. 252,206.

Figure 5:
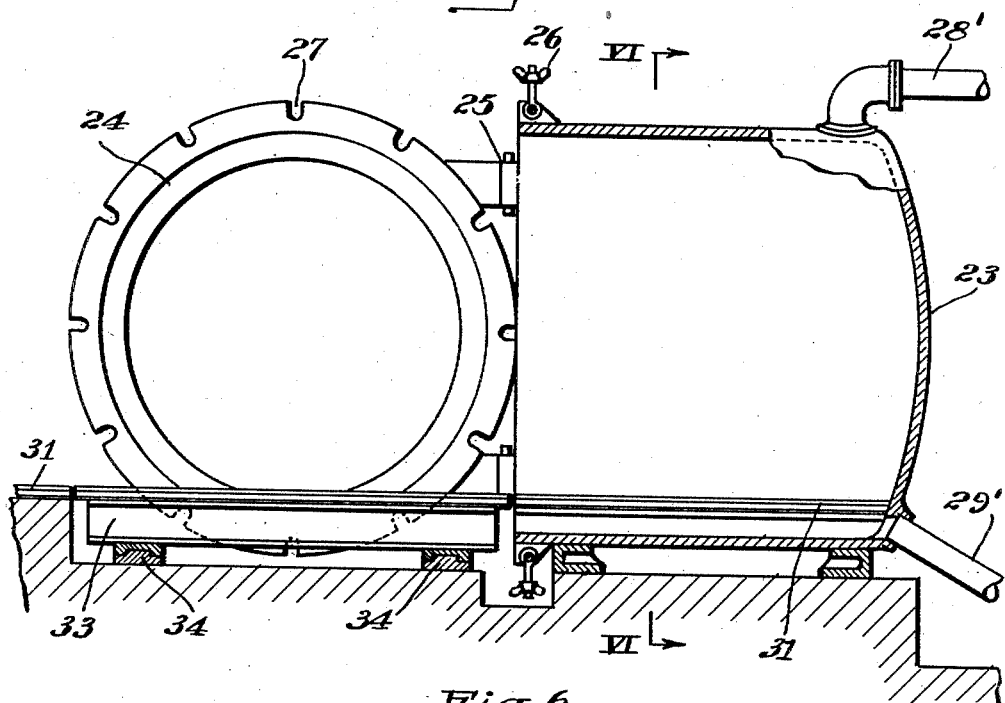
Figure 6:
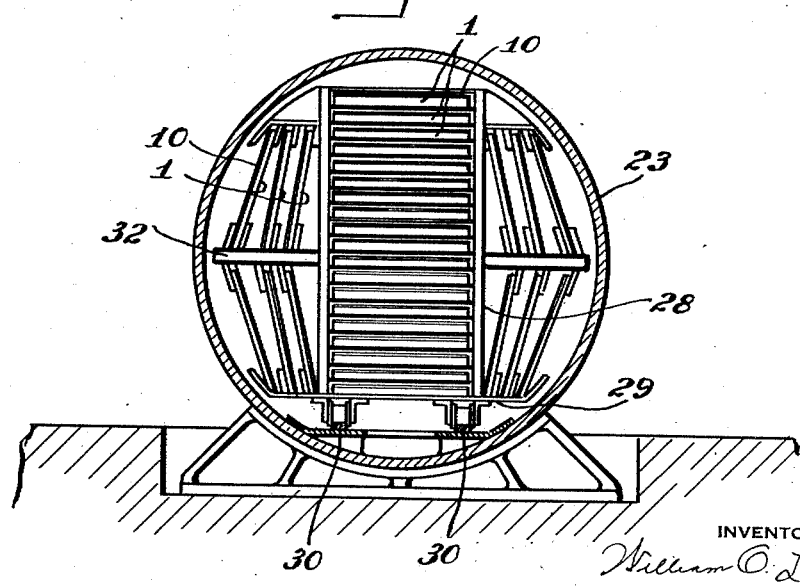

The invention relates to a process and apparatus for making composite glass, and particularly to the process and means for applying heat and pressure to cause the joinder between the glass and celluloid. Composite glass ordinarily comprises two sheets of glass with a sheet of celluloid or equivalent cemented therebetween, although a greater or less number of layers of material may be employed. It is preferred to assemble the sheets with a coating of cement, such as gelatin dried upon the surfaces of the glass sheets, which are to be cemented to the celluloid, the heat subsequently applied to the assembled sheets serving to soften the gelatin and secure adhesion when pressure is applied, but it will be understood that the apparatus may be used in other ways. For instance, a sufficient amount of heat and pressure will cause the adherence of the celluloid to the glass without the use of any cement, particularly if a solvent is applied to the celluloid, and the invention may be employed in such way, if desired. The invention has for its primary objects, the provision of a process and apparatus whereby the necessity of using rubber bags in containers in the hydraulic pressing operation is avoided, while retaining the advantages incident to the use of such bags; the provision of a procedure and apparatus whereby the set of sheets is securely held in assembled relation without danger of relative movement during the handling thereof preliminary to the application of heat and pressure in the press, the provision of a process and apparatus insuring that the sheets constituting the composite plates shall be held perfectly flat from the time they are assembled until they are removed from the apparatus in finished condition; and the provision of a process and apparatus which may be readily applied to quantity production with a minimum amount of breakage, and which a low cost of upkeep, the apparatus throughout being substantially permanent in character. Certain embodiments of the invention are shown in the accompanying drawings, wherein:

Figure 1 is a perspective view of one form of tray which is employed. Figs. 2, 3 and 4 are sections on the lines II—II, III—III and IV—IV, respectively of Fig. 1. Fig. 5 is a vertical longitudinal section through one form of press which may be employed. Fig. 6 is a section on the line VI—VI of Fig. 5. Fig. 7 is a side elevation of a device for pressing the closures onto the trays preliminary to the application of suction thereto. Figs. 8, 9, 10 and 11 illustrate a modified form of tray, Fig. 8 being a perspective view, and Figs. 9, 10 and 11 being sections on the lines IX—IX, X—X and XI—XI of Fig. 8. Fig. 12 is a fragmentary section through a modified form of tray and closure. And Fig. 13 is a fragmentary section through a magnetic lifting device for handling the tops or closures of the trays.

In preparing the plates for the application of pressure in a hydraulic press, the three sheets are first assembled in the tray 1, as indicated in Figs. 1, 2, 3 and 4, wherein: 2 and 3 are the glass sheets having their inner faces coated with a film of gelatin and 4 is the interposed sheet of celluloid or other suitable, tough, joining material to which the glass is to be cemented. The tray 1, as shown, is in the form of a casting, preferably of aluminum provided with suitable ribs 5 for making the structure rigid against deflection. This casting has a rim portion 6 extending slightly above the level of the assembled sheets and provided with a packing or sealing member 7, preferably of rubber seated in a groove 8 in the top of the rim. After the glass is positioned on a layer of blotting paper 9, a second sheet 22 is applied over the top surface of the sheet 2 and the closure member 10 is seated in position, as indicated in Fig. 3. This closure member comprises a very thin sheet of metal, preferably of nickel steel and relatively flexible, so that when hydraulic pressure is applied thereto, such pressure will be transmitted uniformly throughout the area of the glass plate, the rigid bottom member of tray at such time serving to hold the composite sheet perfectly flat and free from deformation, such as might occur if the bottom member were made flexible like the top member. The maintenance of the composite sheet in a perfectly flat position during the cementing operation is very desirable, as otherwise, a sheet which is cemented in a distorted position out of a true plane will retain such distortion after the cement has set.

In order to apply suction to the space beneath the closure member 10 carrying the composite sheet, the passage 11' is provided, such passage being normally closed by the ball valve 12 pressed inward by the spring 13. The valve 12 is provided with a stem 14 carrying the levers 15 fulcrumed to the brackets 16 carried by the screw plug 17. When it is desired to apply suction to the space below the closure plate 10, the pipe 17' connected to an exhaust system is pushed in against the levers 15, thus opening the valve 12 and exhausting the air from beneath the plate 10. When the pipe 17 is removed, the valve 12 will seat itself, thus holding the vacuum beneath the plate 10. The application of suction in this manner serves to clamp the plates against the bottom of the tray, due to the unbalanced atmospheric pressure upon the upper surface of the plate, itself, so that any slippage of the plates upon each other during handling is avoided and any separation of the sheets is prevented, even though the trays are inserted in a press in vertical position.

In case the set of sheets to be joined together do not fit snugly into the rim 6 of the tray, the filler strips 18 are employed, as indicated in Figs. 3 and 4. These filler strips serve to support the top plate 10 at the edge of the sheets 2, 3 and 4, so that undue pressure is not applied to such edges. This protection of the edges of the sheets against undue pressure is desirable, as otherwise the celluloid will be pressed out from between the glass sheets under the heavy hydraulic pressure employed and correspondingly thinned. Under these conditions, when the plate is removed from the press, there is a tendency of the glass to separate from the celluloid at the edge of the sheet and it has been found necessary to cut out the celluloid around the edge of the plate and replace it with a filler. The use of the filler strips 18 in conjunction with the metal plate 10 avoids this difficulty, and if desired, the edges of the sheets may be further relieved of pressure by making the strips 18 of slightly greater depth than the thickness of the composite plate.

In order to keep the cover plate 10 in association with the tray 1 when not in use, the expedient illustrated in Fig. 4 may be employed, one side of the tray being grooved, as indicated at 11, in order to receive the edge of the sheet 10 when it is swung up to vertical position. In order to bring the plate 10 into sealing contact with the packing strips 7 before the application of suction thereto, the assembled tray and cover plate may be placed upon a platform 19, as indicated in Fig. 7, such platform being movable up and down by means of a hydraulic cylinder 20 and the parts as thus assembled moved up against the platform 21, which has its lower face co-extensive in area with that of the plate 10. The plate 10 is thus pressed down into contact with the sealing strips 7 preliminary to the application of the exhaust pipe 17', thus insuring against leakage during the application of the exhaust. To better distribute the pressure upon the glass and to avoid scratching it, the layers of blotting paper 22 and 9 are preferably employed on both the upper and lower sides of the set of plates in the tray (Fig. 4).

The tray as thus sealed and exhausted may be subjected to hydraulic pressure in any suitable press, such as that shown in Figs. 5 and 6 and later described, or such as that shown in my co-pending application of even date herewith, Serial Number 252,205, the press in such case being cylindrical in cross section, the same as in Figs. 5 and 6, but having its center line vertical instead of horizontal. This press comprises a body portion or tank 23 and a door or head 24, preferably mounted upon hinges 25. When the door is closed, it is clamped securely in such position by use of the pivot clamping bolts 26 adapted to extend through the slots 27 in the edge of the head. A circulation of hydraulic fluid is secured by means of the pipes 28' and 29' secured to a suitable circulation and pressure system. Water is circulated through the tank carrying the trays until the temperature of the sheets to be joined together reaches about 250 deg. F., at which time the pressure is increased to about 150 lbs. pressure per square inch. After this pressure and temperature has been secured, the circulation of water is continued, still maintaining the pressure, and the temperature gradually decreased until the plates are at a temperature at which they can be conveniently handled, after which the water is drained from the tank and the trays are removed. The trays are preferably transported to the tank on racks 28 mounted upon a truck 29 having wheels 30 engaging the track 31. The rack is provided with a plurality of horizontal shelves in which the trays 1 are placed, and in order to utilize the space in the tank to the fullest advantage, additional racks 32 are provided at the side of the rack 28 in which the trays 1 may be supported in vertical or inclined position, as shown in Fig. 6. In this manner, a maximum number of plates may be formed in the pressure tank at one time. In order to permit of the closing of the door, the section 33 of the track must be moved out of the way and this is accomplished by mounting the section 33 upon a transversely extending track 34. Before closing the door, this section 33 is moved laterally until the door is closed, and after the pressing operation has been completed and the door opened, the section 33 is moved back into position, so that the truck 29 carrying the racks can be moved out upon the track 31.

Figs. 8, 9, 10 and 11 illustrate a modification wherein the ribs 35 extend longitudinally of the bottom of the tray 36, there being no cross ribs as in the other type of construction. If desired, the ribs may, of course, be omitted, thus adding somewhat to the weight of the trays, the only requirement being that the tray be relatively rigid so that it will not give under pressure or during handling, thus insuring that the glass plates shall be held perfectly flat and true. It follows that all of the relative inward movement of the tray and its closure is confined to the closure plate, which is preferably only $\frac{1}{32}$ of an inch or less in thickness. In this type of construction, a different method of supporting the closure plate 37 is employed, as indicated in Fig. 11 such closure plate being hinged at 38 to the edge of the tray instead of fitting into a groove therein, as in the Fig. 4 construction. A different type of valve is also provided in this construction for the passageway 39, such valve comprising a plug 40 screw threaded in the position shown, so that by rotating it, the valve end 41 may be moved in and out. This movement of rotation is secured by means of the key 42 on the rotatable end 43 of the vacuum pipe 44, such key being adapted to engage a suitable slot 45 in the end of the plug 40. The air is exhausted in the use of this construction the same as in that of the construction heretofore described, and in the use of both constructions, after the removal of the trays from the press, the closure plates may be released by opening the valves and applying air pressure through the pipes 17' and 44 to the space beneath the closure plates.

Fig. 12 illustrates a further modification in which the tray 46, similar in construction to those heretofore described, is provided with a closure plate or sheet 47 of rubber having its edge beveled off, as indicated at 48. This form of closure plate, while somewhat more expensive, and more subject to deterioration in use than the sheet metal plates heretofore described, does not require any holding means for seating it during the application of suction, as described in connection with the device of Fig. 7.

Any suitable means may be employed for handling the metal closure plates 10, when such plates are made separate from the trays, one such means being shown in Fig. 13, wherein the arm 49 is provided carried by a suitable crane with magnets 50 for lifting the closure plates 10. If desired, these arms may be moved along in a continuous series, bringing the plates into position of use at which the assembling occurs.

What I claim is:

1. The process of making a composite plate from a set of sheets of similar size, which consists in assembling the sheets in a container having opposing flat sides, one at least of which is flexible and the other rigid, exhausting the air from the container to cause the flexible side to press the set of sheets tightly against each other and against the flat, rigid side of the container, inserting the container as thus exhausted into a pressure chamber, and applying fluid pressure to said chamber.

2. The process of making a composite plate from a set of sheets of similar size, which consists in assembling the sheets with the edges thereof substantially flush, and with the bottom sheet resting upon a flat supporting member, applying atmospheric pressure to clamp the plates against the supporting member, and then placing said member with the set of sheets thereon in a pressure chamber and applying pressure thereto.

3. In apparatus for securing together a set of sheets, a tray having a flat rigid bottom adapted to receive the set of sheets, a removable flexible sheet closing the top of the tray and making sealing contact with the edges thereof, means for exhausting the air from the interior of the tray to bring the edges of said sheet into sealing contact with the edges of the tray and to cause the pressure of the atmosphere on the flexible sheet to clamp the series of sheets tightly against the flat rigid bottom of the tray, and a pressure chamber for receiving the tray, with means for applying fluid pressure thereto on all sides of said tray and its closure.

4. The process of making a composite plate from a set of sheets of similar size, which consists in assembling the sheets in a container having opposing flat sides, one at least of which is flexible and removable and the other rigid, clamping the edges of the flexible sheet to the edges of the container, exhausting the air from the container to cause the flexible side to press the set of sheets tightly against each other, and against the rigid side of the container, releasing the clamping pressure at the edges of the flexible sheet, inserting the container into a pressure chamber, and applying fluid pressure to said chamber.

5. In apparatus for securing together a set of sheets, a tray having a flat rigid bottom adapted to receive the set of sheets, a removable flexible metal sheet closing the top of the tray and making sealing contact with the edges thereof, means for exhausting the air from the interior of the tray to bring the edges of said sheet into sealing contact with the edges of the tray and to cause the pressure of the atmosphere on the flexible sheet to clamp the series of sheets tightly against the flat rigid bottom of the tray and a pressure chamber for receiving the tray, with means for applying fluid pressure thereto on all sides of said tray and its closure.

In testimony whereof, I have hereunto subscribed my name this 27th day of January, 1928.

WILLIAM O. LYTLE.